G. MEADER.
CORN HARVESTER.
No. 77,394.
Patented Apr. 28, 1868.
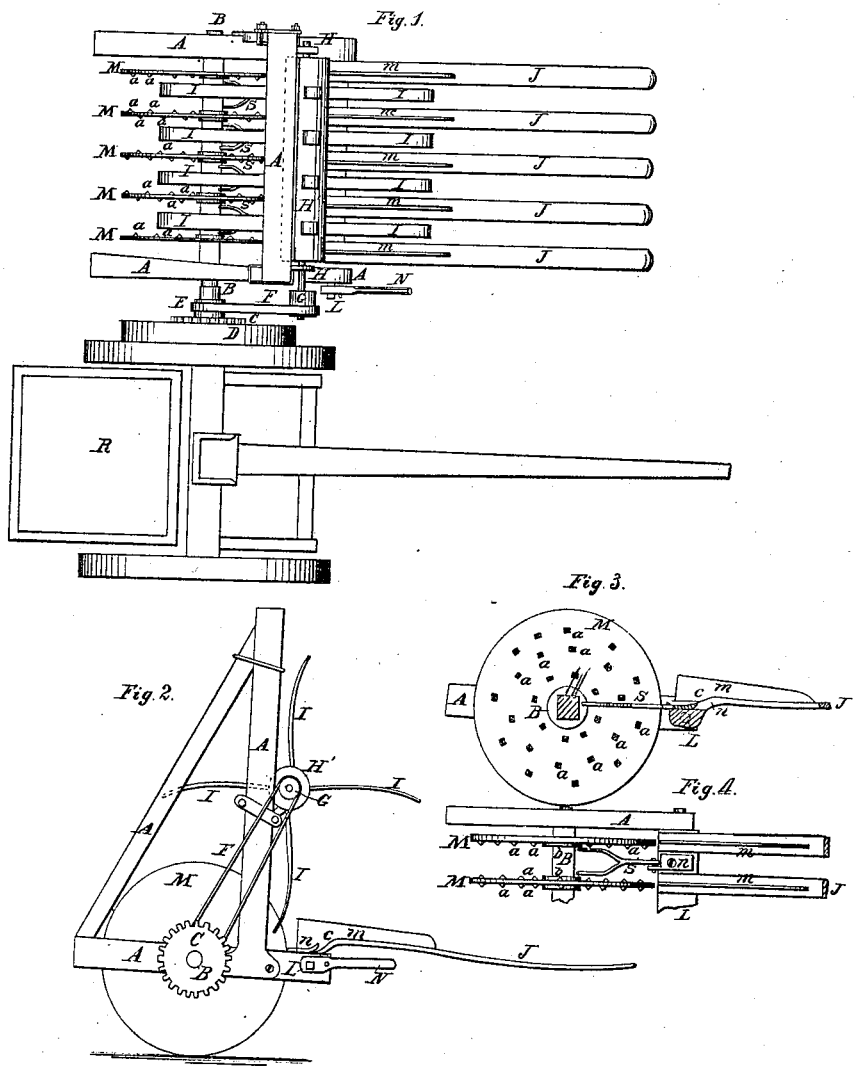

United States Patent Office.

GEORGE MEADER, OF PRAIRIE CENTRE, ILLINOIS.

*Letters Patent No. 77,394, dated April 28, 1868; antedated April 19, 1868.*

IMPROVEMENT IN CORN-HARVESTERS.

*The Schedule referred to in these Letters Patent and making part of the same.*

TO ALL WHOM IT MAY CONCERN:

Be it known that I, GEORGE MEADER, of Prairie Centre, in the county of La Salle, and State of Illinois, have invented a new and useful Improved Corn-Picker and Husker; and I do hereby declare and make known that the followi is a full, clear, and exact description of the same, reference being had to the accompanying drawings, and the letters and figures marked thereon, which form part of this specification.

My invention consists in a machine which may be attached upon one side of an ordinary farm-wagon, or may be so constructed as to form a separate, complete machine in itself, which, being drawn by horses along, through, and parallel with the rows of standing corn, will pick the ears of corn from the stalks, and also husk the same, and, if desired, by means of suitable attachments, will deliver the husked corn into the wagon alongside, or into a suitable receptacle therefor upon the machine, when used without the wagon attached.

To enable those skilled in the art to understand how to construct and use my invention, I will proceed to describe the same with particularity, making reference, in so doing, to the aforesaid drawings, in which—

Figure 1 represents a plan or top view of my invention.

Figure 2 is a side elevation of the same.

Figure 3 represents a detached side view of one of the husking-disks, and

Figure 4 a detached top view of the same, the upper part of the machine being removed.

Similar letters of reference, in the several figures, denote the same parts of my invention.

A represents a suitable frame, which supports a shaft, B, upon which the husking-plates or disks are arranged, and by means of which the pickers are operated, as hereinafter specified.

Upon one side of a wagon-wheel, when the machine is used in that connection, a circular rim, D, is secured, in any suitable manner, upon whose interior circumference is a series of cogs or teeth; and upon the end of the shaft B is a pinion, C, and the apparatus is so arranged and secured to the wagon, that said pinion gears with the toothed rim D, so that the revolution of the drive-wheel or wagon-wheel will rotate the shaft B in the same direction as the supporting-wheels of the apparatus revolve in being moved forward over the ground.

Upon the upper frame is arranged a shaft, H, provided with a drum, G, and thus, by means of the belt F passing around said drum G, and also a drum, E, upon the shaft B, as shown, the rotation of said shaft B also rotates the shaft H, upon an enlargement, H', of which the picking-fingers I are attached.

Through the front part of frame A passes a rocking-shaft, L, having a lever, N, upon one end thereof, so that the arms or guides J may be adjusted as desired by raising or lowering the front ends thereof, said arms J being rigidly secured upon the said rock-shaft L; or said shaft L may be rigidly fixed to the frame A, so that the arms J shall not be adjustable; or said arms may be made adjustable in any other suitable manner.

Upon said arms, near the shaft L, are arranged suitable partitions *m*, forming channels in which the ears lie separate and one by one, as hereinafter specified.

Upon said shaft or beam L, between each of said arms J, are arranged edged chisels or cutters, marked *n*, immediately behind a depression or curve, *c*, in the arms J.

Directly in the rear of these fingers or arms J, and corresponding with them in position, so that the revolving arms I pass between said arms and wheels, is arranged upon the shaft B a series of wheels, with roughened sides, marked M, the burrs or projections thereupon being indicated by the letter *a*. These wheels are so arranged upon the shaft as to have a lateral movement with respect to each other, by means of springs S, which, while retaining the wheels M in position, allow them to yield upon pressure, so as to adapt them to the passage between them of ears of different sizes.

Instead of the springs S, as shown, any other arrangement or species of spring may be used to effect the same purpose.

Having described the nature and construction of my improved machine, I will proceed to describe its operation.

The height of the ends of the gathering-arms J having been properly adjusted so as to lie below the ears as they hang upon the stalks, the machine is moved along between the rows, and the stalks pass between the said arms (which are at such a distance from each other as not to permit the ears to drop through) until they reach the shoulder $c$ upon the arms, and lie within the enclosed space between the partitions, on keeping the ears endwise between them, when the curved ends of the picking-fingers press the ear of corn past the cutters $n$ until the connection between the ear and the stock lies directly over said cutters, when the end of the fingers, in connection with said cutters, picks the ears from the stalks, and forces them back between the husking-wheels M, which, revolving in the opposite direction, neatly and cleanly strip off the husks, and deliver the husked corn at the rear of the machine, where, if desired, an elevator may be arranged to carry the corn up and deliver it into a receptacle, R, therefor.

Having now described the nature, construction, and operation of my invention. I will specify what I claim, and desire to secure by Letters Patent.

1. I claim the combination of gatherers J, cutters $n$, and pickers I, arranged and operating substantially as and for the purposes set forth.

2. I claim the combination of said gathering-arms J with a rock-shaft, L, or its equivalent, for rendering said gatherers adjustable substantially as described and set forth, and for the purpose of adapting the machine to corn of different heights.

3. I claim providing said gatherers with the partitions $m$, substantially as and for the purposes set forth.

4. I claim providing said gathering-fingers J with the depressions $c$, in the manner specified.

5. I claim the arrangement of the cutters $n$ immediately behind the shoulders $c$, as and for the purposes set forth.

6. In combination with said gatherers J and pickers I, I claim the adjustable husking-plates or wheels M, arranged and operating substantially in the manner and for the purposes set forth.

GEORGE MEADER.

Witnesses:
 DAVID CONGER,
 QUINCY A. KELLOGG.